United States Patent [19]

Schorfheide

[11] Patent Number: 4,690,806

[45] Date of Patent: Sep. 1, 1987

[54] REMOVAL OF SULFUR FROM PROCESS STREAMS

[75] Inventor: James J. Schorfheide, Sarnia, Canada

[73] Assignee: Exxon Research and Engineering Company, Florham Park, N.J.

[21] Appl. No.: 858,036

[22] Filed: May 1, 1986

[51] Int. Cl.$^4$ ............... C01B 17/10; C01B 31/20; C01B 17/00; B01J 8/00

[52] U.S. Cl. ................................. 423/230; 423/244

[58] Field of Search ........................... 423/230, 244 R

[56] References Cited

U.S. PATENT DOCUMENTS

| | | | |
|---|---|---|---|
| 2,269,508 | 1/1942 | Barton | 423/600 |
| 2,413,184 | 12/1946 | La Lande | 423/600 |
| 2,474,215 | 6/1949 | Kirby | 423/600 |
| 3,370,963 | 2/1968 | Bonner et al. | 423/600 |
| 4,002,592 | 1/1977 | Baskin | 523/153 |
| 4,263,020 | 4/1981 | Eberly | 423/230 |
| 4,363,790 | 12/1982 | Anderson et al. | 423/230 |
| 4,394,455 | 7/1983 | Bertelsman et al. | 501/120 |
| 4,400,431 | 8/1983 | Henslee et al. | 501/120 |
| 4,425,312 | 1/1984 | Brignac | 423/230 |
| 4,492,677 | 1/1985 | Yoo et al. | 423/244 |

Primary Examiner—John Doll
Assistant Examiner—Lori S. Freeman
Attorney, Agent, or Firm—Llewellyn A. Proctor; Henry E. Naylor

[57] ABSTRACT

A novel high sulfur capacity adsorbent capable of high rates of sulfur adsorption from process streams, which is readily regenerable by simple gas stripping. The adsorbent is characterized as a spinel compound of the formula $M[N_xAl_{2-x}]O_4$, where M is one or more divalent cations selected from the group consisting of copper, Group II-B, i.e., zinc, cadmium, and mercury, and chromium, and Iron Group metals, i.e., iron, cobalt, and nickel, and magnesium, N is one or more trivalent cations selected from the group consisting of Group VI-B, i.e., chromium, molybdenum, and tungsten, manganese, and Iron Group metals, i.e., iron, cobalt and nickel, x is a positive number of value greater than 0 and less than 2.0, and the total cationic charge of $M[N_xAl_{2-x}]$ is 8. The sorbent readily adsorbes sulfur, e.g., organosulfur compounds and hydrogen sulfide, from gas streams.

18 Claims, No Drawings

REMOVAL OF SULFUR FROM PROCESS STREAMS

FIELD OF THE INVENTION

This invention relates to the removal of sulfur from industrial, or process streams. In particular, it relates to a process for the removal of sulfur from gas process streams, especially a hydrogen sulfide containing hydrogen gas stream such as the hydrogen gas recycle stream of a reforming unit.

BACKGROUND AND PRIOR ART

Sulfur occurs in many industrial, or process streams, generally as hydrogen sulfide or as an organosulfur compound, or compounds. For example, in virgin naphtha and heating oil, the mercaptans and disulfide types are the predominant forms of sulfur. Thiophenes and benzothiophenes appear the predominant forms of sulfur in virgin gas oils and cracked stocks. A hydrotreated product, even after most of the sulfur has been removed, generally yet contains some of the native organosulfur compounds, or different forms of organosulfur compounds, and additionally hydrogen sulfide. Natural gas, flue gas, waste gas, and recycle gas streams often contain various forms of sulfur, e.g., hydrogen sulfide. Adsorbents, or sorbents, of various types have been long known as materials useful for the removal of sulfur from process streams.

The quality of these various sorbents for the adsorption and removal of sulfur varies considerably, and in many applications it is necessary to scrub essentially all of the sulfur from the process streams. This is necessary for process reasons, as well as environmental reasons. Sulfur, for example, is a well known catalyst poison which finds its way into a catalytic process employed to treat hydrocarbons, as in petroleum refining operations, principally via the feed, and it can gradually accumulate upon and poison a catalyst. Essentially all petroleum feeds as well as gas-liquid products, and recycle streams of hydrogen-containing gas contain sulfur. Most of the sulfur, because of this adverse effect, is removed from the feed, typically by hydrotreating or hydrodesulfurization. Additional sulfur removal can be achieved by passage of the hydrofined or hydrodesulfurized feed through a guard chamber or sulfur trap, e.g., by contact in a guard bed, or sulfur trap with a nickel or cobalt adsorbent.

Catalytic reforming, or hydroforming, is a well-known and important process employed in the petroleum refining industry for improving the octane quality of naphthas and straight run gasolines. This process is illustrative of one wherein the presence of sulfur can have a detrimental effect. In a typical reforming process, a series of reactors are provided with fixed-beds of a sulfided catalyst which are sequentially contacted with a naphtha feed, and hydrogen, each reactor being provided with a preheater, or interstage heater, because the reactions which take place are endothermic. The more recently developed processes of this type employ polymetallic platinum-containing catalysts (wherein one or more additional metals are added as promoters to the platinum), and it has, in fact, become essential to reduce the feed sulfur to only a few parts per million parts by weight (wppm) of feed, because of the extreme sulfur sensitivity of these catalysts. For example, in the use of platinum-rhenium catalysts it is generally necessary to reduce the sulfur concentration of the feed naphtha well below about 10 wppm, and preferably well below about 2 wppm, or even 0.5 wppm, to avoid excessive loss of catalyst activity and $C_5^+$ liquid yield.

In the past, sulfur has been removed from the recycle hydrogen stream by the use of guard chambers filled with metal oxides, e.g., zinc oxide, cobalt oxide, nickel, or the like. In Paul E. Eberly, Jr.'s U.S. Pat. No. 4,263,020, in particular, there is disclosed the use of a form of metal aluminum spinel which is particularly effective for the removal of sulfur from process streams, especially for the removal of sulfur from a sulfur-containing hydrogen recycle stream as employed in reforming operations. A stoichiometric oxide spinel is described generally as a material having the formula $MN_2O_4$ and a crystalline structure of the type exhibited by such minerals as gahnite ($ZnAl_2O_4$), hercynite ($FeAl_2O_4$), chromite ($FeCr_2O_4$), or spinel ($MgAl_2O_4$), the latter of these being the material after which the spinel structure is named. The metal alumina spinel therein described, in any event, is employed within a guard chamber as a particulate mass, and it is characterized as $MAl_2O_4$ wherein M is chromium, iron, cobalt, nickel, copper, cadmium, mercury, or zinc; and zinc alumina spinel is described as a preferred species of sulfur adsorbent. After adsorption of the sulfur, the sulfur can be readily desorbed, or removed from said particulate mass of metal alumina spinel by contacting, and purging same with a relatively clean gas stream, suitably hydrogen, hydrogen-containing gas, or an inert gas, at elevated temperature.

The Eberly process admirably achieves its intended objective, especially in its use as an adsorbent for the removal of sulfur from process gas streams, notably sulfur-containing hydrogen gas streams, particularly hydrogen recycle gas streams as employed in reforming operations. Sulfur is readily removed from such streams sufficient to maintain sulfur in low concentrations, concentrations well below about 2 wppm, and the capacity of the adsorbent for removing sulfur in this manner is outstanding.

OBJECTS

It is, nonetheless, a primary objective of the present invention to provide a further improved adsorbent, one capable of high rates of sulfur adsorption and high capacity for the adsorption of sulfur from process streams.

A particular object is to provide a novel high sulfur capacity adsorbent, as characterized, which is readily regenerable by simple gas stripping.

A more specific object is to provide a process as characterized which utilizes a new and improved sorbent which readily adsorbs hydrogen sulfide from gas streams, a sorbent which can be regenerated by simply stripping the hydrogen sulfide from the sorbent with a gas, and the hydrogen sulfide readily removed from the stripping gas, suitably by contact with an alkali or amine solution.

THE INVENTION

These objects and others are achieved in accordance with the present invention, embodying a process wherein a particulate mass of a spinel compound characterized by the formula $M[N_xAl_{2-x}]O_4$, where M is one or more divalent cations selected from the group consisting of magnesium, copper, Group II-B, i.e., zinc, cadmium, and mercury, and chromium, and Iron Group metals, i.e., iron, cobalt, and nickel, N is one or more trivalent cations selected from the group consisting of Group VI-B, i.e., chromium, molybdenum, and tungsten, manganese, and Iron Group metals, i.e., iron, cobalt and nickel, of the Periodic Table of the Elements (E. H. Sargent & Co. Copyright 1964, Dyna Slide Co.), x is a positive number of value greater than 0 and less than 2.0, and the total cationic charge of $M[N_xAl_{2-x}]$ is 8. Preferably the value of x is at least about 0.1, and preferably at least about 0.3. In the stoichiometric oxide spinel $M[N_xAl_{2-x}]O_4$, M can be a single divalent metal, or M can represent more than one divalent metal. N can be a single trivalent metal, or N can represent more than one trivalent metal.

The present invention is based principally on the discovery that the sulfur adsorption capacities of the metal aluminum oxide spinels $MAl_2O_4$, where M is chromium, iron, cobalt, nickel, copper, cadmium, mercury, or zinc as described in U.S. Pat. No. 4,263,020, supra, is greatly increased by replacing a portion of the aluminum, or $Al^{3+}$ cations, by the aforesaid non-aluminum trivalent metal cations, viz., Group VI-B metals, i.e., chromium, molybdenum, and tungsten, manganese, and Iron Group metals, i.e., iron, cobalt, and nickel. These metals per se have greater affinity for sulfur than aluminum which may be the reason that these metals measurably improve the sulfur adsorption rate, and capacity of the stoichiometric oxide spinels of this invention vis-a-vis metal aluminum spinels, $MAl_2O_4$, which contain only a net +2 charge of non-aluminum cations. Thus, the former unit spinel crystal structure is retained, while simultaneously the unit spinel cell structure of this invention is packed with a greater number of cations which have a higher affinity for sulfur adsorption than aluminum. Accordingly, it appears that a greater number of sites are created which have a high affinity for sulfur, and consequently the capacity of the spinel cell structure for the adsorption of sulfur is drastically increased.

A preferred species of the stoichiometric oxide spinel is one wherein M of the formula $M[N_xAl_{2-x}]O_4$ is zinc, or zinc in combination with one or more other divalent metal cations, and at least about 5 mole percent, preferably at least about 15 mole percent of the aluminum has been replaced by a trivalent Group VI-B or Iron Group metal, particularly iron or chromium, or both. A preferred species of the stoichiometric oxide spinel is, e.g., $Zn[N_xAl_{2-x}]O_4$ wherein N is a trivalent Group VI-B or Iron Group metal, especially iron or chromium, or both, and x is at least about 0.1, preferably at least about 0.3. Examples of such stoichiometric oxide species are $Zn[Fe_{0.2}Al_{1.8}]O_4$, $Zn[Fe_{0.6}Al_{1.4}]O_4$, $Zn[Fe_{1.6}Al_{0.4}]O_4$, $Zn[Cr_{0.3}Al_{1.7}]O_4$, and $Zn[Cr_{1.2}Al_{0.8}]O_4$ and the like. Another species of the preferred stoichiometric oxide spinels is one wherein N is a trivalent Group VI-B or Iron Group metal, or both, and M is zinc in combination with one or more other divalent metals selected from the group consisting of chromium, iron, cobalt, nickel, copper, cadmium, magnesium, or mercury and the sum total of the divalent metals provide a charge of 2+. Examples of these species of stoichiometric spinels are $Zn_{0.5}Fe_{0.5}(Fe_{0.6}Al_{1.4})O_4$, $Zn_{0.8}Mg_{0.2}[Fe_{0.6}Al_{1.4}]O_4$, $Zn_{0.5}Ni_{0.5}[Fe_{0.4}Al_{1.6}]O_4$, $Zn_{0.5}Mg_{0.5}[Cr_{0.5}Al_{1.5}]O_4$, and the like.

It is essential that the electrical charge on the cationic metal M be 2+, or where more than one divalent metal M is present in the stoichiometric oxide spinel that the electrical charge of each is 2+. Likewise the total charge on the cationic moiety $[N_xAl_{2-x}]$ must be 6+ to preserve the electrical neutrality with the number of oxygens present in the structure. It will be noted that some metals useful in forming the oxide spinel structure $M[N_xAl_{2-x}]O_4$, i.e., the Iron Group metals, and chromium, fit the formula for either M or N. This is because these metals of the two groupings can be either divalent or trivalent. In a given species of the oxide spinel structure $M[N_xAl_{2-x}]O_4$, M and N can thus be elementally the same or different, but whether elementally the same or different, the moiety M will in its electrical effect be a divalent cation, i.e., it will provide a 2+ charge, and N or its electrical effect will be a trivalent cation. The moiety $[N_xAl_{2-x}]$ will provide an electrical charge of 6+ which, taken with M will provide a total electrical charge of 8+. The value of $M+[N_xAl_{2-x}]$ will thus equal 8+ which will balance with the 8− electrical charge provided by the four oxygen atoms.

In practicing the process of this invention, a particulate mass of the stoichiometric oxide spinel, $M[N_xAl_{2-x}]O_4$, is contacted with a process stream which contains sulfur, e.g., organosulfur, hydrogen sulfide or other sulfur compounds, such that sulfur is adsorbed onto said particulate mass of oxide spinel, and sulfur thereby removed from said process stream. Thereafter, the sulfur, sulfur compounds, and other contaminants, are readily desorbed, or removed from said particulate mass of stoichiometric oxide spinel by contacting, and purging the sulfur-containing mass with a relatively clean gas stream, suitably hydrogen, or a hydrogen-containing gas, at elevated temperature.

In a preferred operation, a particulate mass of the stoichiometric oxide spinel, notably a zinc species of the stoichiometric oxide spinel, is charged, or packed into a guard chamber, or series of guard chambers. Suitably, the series of stoichiometric oxide spinel guard chambers are employed in parallel, this permitting active use of one guard chamber, or set of serially aligned guard chambers for contact and purification of a process stream while the other guard chamber, or set of serially aligned guard chambers, is taken out of service for regeneration. In the treatment of a hydrogen recycle gas stream, as employed in reforming, it is found that the hydrogen sulfide and other species of sulfur, if any, can be readily adsorbed from the stream despite its high moisture content. The spinel, notably the zinc species of the stoichiometric oxide spinel, is also quite stable whereas many materials in contrast are deteriorated by contact with the acidic hydrogen-containing gas. Moreover, the stoichiometric oxide spinel, notably the zinc species of the stoichiometric oxide spinel, shows a high capacity for adsorption of the hydrogen sulfide, several times that of many sulfur sorbent materials; and, in fact, has greater sulfur adsorption capacity than the metal alumina spinel $MAl_2O_4$ described in U.S. Pat. No. 4,263,020, supra. Indeed, the sulfur capacity of the stoichiometric oxide spinel $M[N_xAl_{2-x}]O_4$, can range four to five times that of the patented metal alumina spinel, $MAl_2O_4$. No special preparation of the particulate species of the stoichiometric oxide spinel is required, and it can be employed in a guard chamber as powder, spheres, tablets, pellets, extrudates, irregular shaped particles, or the like in virtually any size. Methods of preparing oxide spinel crystal structures are known in the art.

The temperature of contact between the process stream and the stoichiometric oxide spinel is not critical, and there is no necessity to heat or cool the process stream, notably a hydrogen recycle gas stream. Suitably, the recycle hydrogen stream is contacted with the particulate stoichiometric oxide spinel sorbent at normal gas stream temperatures, i.e., at temperatures ranging from ambient to about 500° F., or more generally at temperatures ranging from about 100° F. to about 300° F.

It would appear that the non-aluminum atoms of the stoichiometric oxide spinel structure form adsorption bonds with the sulfur compound, this being sufficient to remove, e.g., hydrogen sulfide from a recycle hydrogen gas stream. Unlike the mechanism involved in the removal of a sulfur compound, e.g., hydrogen sulfide from a recycle hydrogen gas stream by the use of zinc oxide, there is a high capacity for sulfur which is not the result of chemical reaction wherein zinc sulfide is formed. Apparently, as a consequence thereof the oxide spinel is readily regenerated by simply purging, or sweeping the sulfur compound therefrom by contact of the sulfur-containing stoichiometric oxide spinel with a hot, non-reactive, or inert gas after the stoichiometric oxide spinel has become saturated with the sulfur compound. In the preferred practice of this invention, the zinc species of the oxide spinel is simply contacted, purged, or swept with a hydrogen gas stream at elevated temperature to remove the hydrogen sulfide, and other sulfur compounds, and thereby regenerate the stoichiometric oxide spinel. Suitably, the purge is conducted by maintaining the hydrogen gas at temperatures ranging from about 250° F. to about 1200° F., preferably from about 400° F. to about 1000° F. Since burning in the presence of oxygen as practiced in the regeneration of many sorbents is typically unnecessary, the hydrogen sulfide is recovered as hydrogen sulfide rather than as sulfur oxides. Consequently the hydrogen gas stream itself is readily cleansed of the hydrogen sulfide by washing the gas with a caustic or amine solution.

There are situations, however, where it may be desirable to regenerate the sorbent of this invention in the presence of oxygen, e.g., as when it is desirable to remove a carbonaceous residue, to cleanse the sorbent surface, or to ensure that the sorbent is in the form of an oxide. Contact of the sorbent with an oxygen-containing atmosphere, e.g., air, can thus be carried out without harm to the sorbent at temperatures ranging from about 300° F. to about 930° F., or higher, or preferably at temperatures ranging from about 750° F. to about 930° F. as where the removal of a carbonaceous residue is desirable.

The invention will be more fully understood by reference to the following comparative data illustrating its more salient features. All terms are expressed as weight units except as otherwise specified.

EXAMPLE 1

A sample of commercially prepared zinc alumina spinel, a material of nominal composition 95 wt. % $ZnAl_2O_4$, 2.5 wt. % bentonite clay, and 2.5 wt. % silica sol binder, BET surface area 188 $m^2/g$, was evaluated in a first run for comparative purposes by thermogravimetric analysis (TGA) as follows. After an overnight bakeout in flowing $H_2$ at 1000° F., the sample was treated by contact at 150° F. with a flowing stream of 2000 parts, per million parts by volume (vppm) of $H_2S$ in hydrogen. The weight gain of the sample, initially quite rapid, was carefully monitored during the exposure of the mass of $ZnAl_2O_4$ to the flowing 2000 vppm $H_2S/H_2$ gas stream, and monitoring was continued until the rate of additional weight gain deteriorated to a very low level. The flow of $H_2S$ in hydrogen was then discontinued, and the sample was heated to 600° F. under flowing hydrogen. This 600° F. hydrogen regeneration environment was maintained from 1 to 16 hours. (One hour was found sufficient to achieve the obtainable amount of sorbent regeneration between cycles; 16 hours having been simply an overnight convenience.) The sample was cooled to 150° F. in flowing hydrogen, followed by a second cycle of $H_2S$ adsorption (150° F.) - $H_2$ regeneration (600° F.). A total of eight such cycles were performed. The amount of $H_2S$ adsorbed during each cycle, expressed as a weight percentage of the sample weight after overnight bakeout, is shown as Run 1 in Table I.

A preparation was made to produce a stoichiometric oxide spinel of nominal composition $Zn[Fe_{0.6}Al_{1.4}]O_4$, in which $Fe^{+3}$ is incorporated into the crystal structure of $ZnAl_2O_4$ in substitution for trivalent aluminum. The preparation was made as follows: A solution of 114 grams $Zn(NO_3)_2.6H_2O$ dissolved in (200 ml distilled $H_2O + 5$ ml $HNO_3$) and 93 grams $Fe(NO_3)_3.9H_2O$ dissolved in (20 ml distilled $H_2O + 5$ ml $HNO_3$) was added to a solution of 59.2 grams $Na_2Al_2O_4.3H_2O$ in (230 ml distilled $H_2O + 20$ ml $NH_4OH$). The precipitate was filtered, rinsed with approximately 250 ml 0.5M $(NH_4)_2CO_3$ and vacuum-dried overnight at 100° C. The dried material was crushed to a powder and again rinsed and dried. The material was then crushed to a coarse powder and calcined in air for 2 hours at 930° F.

This material, with a BET surface area of 121 $m^2/g$, was confirmed by x-ray diffraction to have a spinel crystal structure intermediate to those of $ZnAl_2O_4$ and $ZnFe_2O_4$. A series of TGA adsorption-regeneration cycles was then carried out on a sample of this material, under the same conditions and procedures employed in the first run. The results of the five TGA cycles performed are summarized as Run 2 in Table I.

The results presented in Table I thus show a substantial $H_2S$ capacity improvement for Run 2 over the current state-of-the-art zinc alumina spinel sorbent, $ZnAl_2O_4$, as employed in Run 1.

EXAMPLE 2

To accelerate testing of the $Zn[Fe_{0.6}Al_{1.4}]O_4$ stoichiometric oxide spinel employed in the product of this invention, as described in Example 1, a multiple-cycle TGA evaluation was conducted as in the preceding example, except that the sample was exposed to much more severe "aging" conditions during the first adsorption cycle, namely 10 vol. % $H_2S$ in hydrogen. The high $H_2S$ adsorption capacities observed during this run are summarized in Column 4 of Table I as Run 3. Additionally, for comparative purposes, a sample of the commercially prepared $ZnAl_2O_4$ described in Example 1 was run under the same accelerated "aging" conditions. The results are summarized in Column 5 of Table I as Run 4.

EXAMPLE 3

An oxide spinel of nominal composition $Zn[Fe_{1.2}Al_{0.8}]O_4$ was prepared by adding a 25° C. solution of 114 grams $Zn(NO_3)_2.6H_2O$ in (200 ml distilled $H_2O + 5$ ml $HNO_3$) and 185.8 grams $Fe(NO_3)_3.9H_2O$ in (200 ml distilled $H_2O + 5$ ml $HNO_3$) to a vigorously stirred solution of 33.4 grams $Na_2Al_2O_4.3H_2O$ in (230 ml distilled $H_2O + 20$ ml $NH_4OH$), also at 25° C. The pH of the total mixture was raised to 8.5 by the addition of 212 ml NH4OH. The precipitate slurry was filtered, rinsed with 250 ml of 0.5 M $(NH_4)_2CO_3$, and vacuum-dried at 130° F. The dried material was crushed to a coarse powder, then rinsed and dried a second time. After drying, the material was again crushed to a coarse powder, then calcined in air for 2 hours at 930° F.

The calcined material, with a BET surface area of 104 $m^2/g$, was confirmed by x-ray diffraction to have a spinel crystal structure intermediate to those of $ZnAl_2O_4$ and $ZnFe_2O_4$, and, more specifically, intermediate to those of the nominal $Zn[Fe_{0.6}Al_{1.4}]O_4$ material, prepared in Example 1, and $ZnFe_2O_4$. A multiple-cycle TGA evaluation was carried out on a sample of this material, using the same conditions and procedures as employed in Example 2. The results of this evaluation are summarized in Table I as Run 5.

The higher sulfur adsorption capacities of the $ZnFe_{0.6}Al_{1.4}O_4$ and $ZnFe_{1.2}Al_{0.8}O_4$ materials is unexpected, as illustrated by the following example. Examining the sulfur adsorption capacities of $ZnAl_2O_4$ and $ZnFe_2O_4$ (Example 4), in which the aluminum cations of the spinel structure have been completely replaced with trivalent iron cations, it is not expected that intermediate compositions, in which only a portion of the aluminum is replaced by iron, would exhibit the high adsorption capacities demonstrated.

EXAMPLE 4

A sample of the oxide spinel $ZnFe_2O_4$ was prepared as follows. A solution of 106 grams $Na_2CO_3$ in 1 liter of distilled $H_2O$ was added to a solution containing 68.1 grams $ZnCl_2$ and 404 grams $Fe(NO_3)_3.9H_2O$ dissolved in water and maintained at 85°–90° C. during the period of $Na_2CO_3$ addition. A second, equal quantity of $Na_2CO_3$ solution was also added at this temperature. After the mixture was cooled to room temperature, the precipitate was filtered and washed with distilled $H_2O$ until the presence of chloride was no longer detected in the effluent wash solution, as indicated by the addition of silver nitrate to an acidified portion of the effluent wash solution. The filtered precipitate was then crushed to a coarse powder and calcined in air for 16 hours at 750° F.

After calcination, this material, with a BET surface area of 44 $m^2/g$, was confirmed by x-ray diffraction to be $ZnFe_2O_4$. The $ZnFe_2O_4$ was tested by TGA as were the other samples in Examples 2 and 3. These data are given in Table I as Run 6. Poor sulfur adsorption capacity, comparable to that of $ZnAl_2O_4$, was found as shown by the data.

TABLE I

| Cycle | Run 1 Wt. % | Run 2 Wt. % | Run 3 Wt. % | Run 4 Wt. % | Run 5 Wt. % | Run 6 Wt. % |
|---|---|---|---|---|---|---|
| 1 | 2.45 | 23.1 | 8.12 | 4.29 | 11.0 | 3.01 |
| 2 | 1.65 | 11.5 | 4.02 | 1.91 | 6.63 | 1.00 |
| 3 | 1.45 | 5.57 | 5.45 | 1.49 | 3.62 | 0.42 |
| 4 | 1.35 | 6.48 | 5.17 | 1.25 | 3.88 | 0.36 |
| 5 | 1.30 | 6.11 | 3.21 | 1.07 | 2.95 | 0.37 |
| 6 | 1.27 | — | 3.07 | 1.08 | 2.93 | — |
| 7 | 1.16 | — | 3.42 | 0.94 | — | — |
| 8 | 1.10 | — | 6.34 | 0.86 | — | — |

The high adsorption capacities exhibited by intermediate compositions $Zn[Fe_{0.6}Al_{1.4}]O_4$ and $Zn[Fe_{1.2}Al_{0.8}]O_4$ (Runs 4 and 5, respectively) are clearly unexpected when contrasted with the sulfur adsorption capacities of the oxide spinels $ZnAl_2O_4$ and $ZnFe_2O_4$ (shown in Table I as Runs 4 and 6, respectively). The results reported in Table I for these runs are re-expressed in Table II, for convenience, as sulfur adsorption per 100 square meters of spinel surface area, thereby eliminating surface area difference between the several materials and further illustrating the unexpected benefits of the intermediate spinel compositions.

TABLE II

Observed $H_2S$ Adsorption Capacities, Weight Percent Per 100 Sq. Meters

| | Run No.: | | | |
|---|---|---|---|---|
| | 4 | 3 | 5 | 6 |
| | Nominal Composition: | | | |
| Cycle | 95% $ZnAl_2O_4$ Wt. % | $ZnFe_{0.6}Al_{1.4}O_4$ Wt. % | $ZnFe_{1.2}Al_{0.8}O_4$ Wt. % | $ZnFe_2O_4$ Wt. % |
| 1 | 2.28 | 6.71 | 10.60 | 6.84 |
| 2 | 1.02 | 3.32 | 6.38 | 2.27 |
| 3 | 0.79 | 4.50 | 3.48 | 0.95 |
| 4 | 0.66 | 4.27 | 3.73 | 0.82 |
| 5 | 0.57 | 2.65 | 2.84 | 0.84 |
| 6 | 0.56 | 2.54 | 2.82 | — |
| 7 | 0.50 | 2.83 | — | — |
| 8 | 0.46 | 5.24 | — | — |

It is apparent that various modifications and changes can be made without departing the spirit and scope of the invention.

Having described the invention, what is claimed is:

1. In a process for the removal of sulfur compounds from a process stream in which a metal alumina spinel sorbent is used, which sorbent is characterized by the formula:

$MAl_2O_4$ wherein M is a divalent cation selected from the group consisting of chromium, iron, cobalt, nickel, copper, cadmium, mercury, magnesium, and zinc, the improvement which comprises: significantly increasing the absorbent capacity of the alumina spinel for said sulfur compounds by:
  (a) providing that M is one or more of the above mentioned divalent cations; and
  (b) substituting at least 5 mole %, but not as much as 100 mole %, of the aluminum with one or more trivalent cations selected from the group consisting of chromium, molybdenum, tungsten, manganese, iron, cobalt, and nickel.

2. The process of claim 1 wherein M of the oxide spinel sorbent is comprised of zinc.

3. The process of claim 1 wherein at least 15 mole % of the aluminum is substituted with the one or more trivalent cations.

4. The process of claim 1 wherein one of the trivalent metals is iron.

5. The process of claim 1 wherein the oxide spinel, which contains adsorbed sulfur after completion of the sulfur sorption cycle, is contacted with an essentially non-reactive or reducing gas at elevated temperature, the sulfur being desrobed and the sorbent thereby regenerated.

6. The process of claim 5 wherein the gas employed to desorb the sulfur from the oxide spinel is comprised of hydrogen.

7. The process of claim 1 wherein M of the formula which characterizes the oxide spinel sorbent comprises zinc, and the sorbent is contacted with an essentially hydrogen gas at elevated temperature to desorb the sulfur and regenerate the sorbent.

8. The process of claim 7 wherein the hydrogen is contacted with said oxide spinel sorbent at temperatures ranging from 250° F. to about 1200° F.

9. The process of claim 8 wherein the hydrogen is contacted with said oxide spinel sorbent at temperatures ranging from about 400° F. to about 1000° F.

10. In a process for the removal of sulfur compounds from a sulfur-containing process stream wherein a series of on-stream reactors are provided with beds of a sulfur sensitive platinum-containing catalyst, a naphtha feed with hydrogen is cocurrently passed sequentially through said series of reactors, and a vaporous effluent rich in hydrogen is taken from the last reactor of the series and recycled, the improvement which comprises contacting said hydrogen recycle stream with an oxide spinel sorbent characterized by the formula $$M[N_xAl_{2-x}]O_4$$

wherein M is one or more divalent metal cations selected from the group consisting of chromium, iron, cobalt, nickel, copper, cadmium, mercury, magnesium, and zinc, N is one or more trivalent metal cations selected from the group consisting of chromium, molybdenum, tungsten, manganese, iron, cobalt, and nickel, x is a positive number of value greater than 0 and less than 2.0, and the total cationic charge of $M[N_xAl_{2-x}]$ is 8, to adsorb sulfur thereon.

11. The process of claim 10 wherein M of the oxide spinel sorbent comprises zinc.

12. The process of claim 10 wherein N of the oxide spinel sorbent is comprised of iron.

13. The process of claim 10 wherein x of the formula is a number of at least about 0.1.

14. The process of claim 10 wherein x of the formula is a number of at least about 0.3.

15. The process of claim 11 wherein the oxide spinel, which contains adsorbed sulfur after completion of the sulfur sorption cycle, is contacted with an essentially non-reactive or reducing gas at elevated temperature, the sulfur being desorbed and the sorbent thereby regenerated.

16. The process of claim 15 wherein the gas employed to desorb the sulfur of the oxide spinel sorbent is comprised of hydrogen.

17. The process of claim 16 wherein the hydrogen is contacted with said spinel sorbent at temperatures ranging from 250° F. to about 1200° F.

18. The process of claim 17 wherein the hydrogen is contacted with said spinel sorbent at temperatures ranging from about 400° F. to about 1000° F.

* * * * *